United States Patent Office 3,491,834
Patented Jan. 27, 1970

3,491,834
SURFACTANT INJECTION PROCESS
George P. Ahearn and Erik I. Sandvik, Houston, Tex., assignors to Esso Production Research Company, a corporation of Delaware
No Drawing. Filed Sept. 19, 1967, Ser. No. 668,956
Int. Cl. E21b 43/22, 43/25
U.S. Cl. 166—273                                      17 Claims

ABSTRACT OF THE DISCLOSURE

A method of recovering oil from a subterranean formation using two liquid banks. The first bank consists of a non-polar liquid, such as an oil, and a sulfonated hydrocarbon surfactant having an average equivalent weight greater than 450 and having a greater solubility in the non-polar liquid than in the second bank liquid. The second bank consists of a polar liquid, such as water or brine, and a second sulfonated hydrocarbon surfactant having an average equivalent weight less than 450 and having a greater solubility in the polar liquid than in the first bank liquid. Methods for obtaining the two surfactants are disclosed and use of the method in treating a water injection well is also disclosed.

BACKGROUND OF THE INVENTION

Field of the invention

This invention relates to shafts or deep borings in the earth commonly known as wells for insertion of a fluid into the interstices of a porous earth formation. The fluid is inserted into the formation through an input well to enable the withdrawal of formation fluid from a producing output well.

Description of the prior art

The petroleum industry has recognized for many years that only a small fraction of the original oil-in-place in a reservoir is expelled by natural mechanisms or primary production. It is also well known that conventional methods of supplementing natural recovery are relatively inefficient. Typically, a reservoir retains about half its original oil even after the application of currently available methods of secondary recovery. Accordingly, there is a continuing need for improved recovery methods which will substantially increase the ultimate yield of petroleum from natural reservoirs.

Waterflooding is by far the most economical and widely practiced of secondary recovery methods. Various flood water additives have been proposed in an effort to increase the efficiency of a waterflood. For example, water thickeners have been developed for the purpose of adjusting flood water viscosity in order to minimize the tendency of the water to finger ahead of the flood front. Corrosion inhibitors and bactericides have been added in order to minimize formation damage and plugging.

Surface-active agents or "surfactants" have been proposed for addition to flood water for the purpose of lowering interfacial tension between the water and the reservoir oil, thereby tending to increase the ultimate recovery of oil displaced by a waterflood. Typical surfactants which have been proposed for this purpose include alkyl pyridium salts, sodium lauryl sulfate, certain sulfonates, glycosides, sodium oleate, and quatenary ammonia salts.

U.S. Patent No. 3,302,713, Ahearn et al., issued Feb. 7, 1967, discloses a surfactant which radically improves the economics of the surfactant waterflooding process. The surfactant is an alkyl aryl sulfonic acid or the salt of such an acid and is obtained by sulfonating at least a portion of the sulfonatable constituents which occur in the 700° to 1100° F. (corrected to atmospheric pressure) boiling range fraction of a petroleum crude. While the surfactant of Ahearn et al. has been shown to be an economical and effective means for petroleum recovery, it has been found to be susceptible to depletion within the formation as are most surfactants and particularly the sulfonate surfactants. Depletion occurs through adsorption of the surfactant on the rock matrix and precipitation of the surfactant by undesirable bivalent cations in the formation water such as $Ca^{++}$ or $Mg^{++}$.

SUMMARY OF THE INVENTION

It has been found that depletion of the sulfonated surfactant can be alleviated or substantially eliminated by producing a preferentially oil-soluble surfactant and a preferentially water-soluble surfactant from the same source material and injecting the oil-soluble portion in a non-aqueous medium and the water-soluble portion in an aqueous medium. Preferably the water-soluble and oil-soluble surfactants are produced by separate sulfonation of separate streams of a crude oil refining process.

In the practice of the invention an oil-soluble surfactant fraction and a water-soluble surfactant fraction are prepared by the fractionation of alkyl aryl sulfonates into oil and water-soluble fractions or by the separate sulfonation of separate streams of a refining process of a vacuum gas-oil distillate to produce oil and water-soluble fractions. The oil-soluble fraction is dispersed in a non-polar bank and injected into the reservoir. The water-soluble fraction is dispersed in a polar bank and injected into the reservoir as a following bank. The polar and non-polar banks are driven toward an outlet well by an aqueous flooding medium.

The primary object of the invention is to improve the surfactant-waterflooding process. Another object is to relieve the depletion of sulfonate surfactants in waterflooding processes. Another object is to improve the compatibility of the surfactants used in the waterflooding process with high concentrations of bivalent cations in the formation or flooding water. Another object is to improve the injectivity of water in a waterflooding process. These and other objects of the invention will be apparent from the description of the preferred embodiment.

DESCRIPTION OF THE PREFERRED EMBODIMENT

In the preferred embodiment of this invention a water-soluble, alkyl aryl sulfonate surfactant and an oil-soluble alkyl aryl sulfonate surfactant are produced by separate sulfonation of separate streams of a refining process of a vacuum gas-oil distillate, the oil and water soluble surfactants are respectively dispersed in oil and water banks and injected into the reservoir, and the two surfactant banks are driven to a withdrawal well by an aqueous flooding medium. The purpose of separately sulfonating or fractionating the surfactant, the characteristics of the fractions, the methods of fractionation, and other uses of the invention are described hereinafter.

It has been found that the sulfonated surfactant of U.S. Patent No. 3,302,713 can be separated into preferentially oil-soluble and preferentially water-soluble portions and that these portions have distinctive characteristics which can be utilized in the practice of the invention to radically improve the surfactant waterflooding process.

The oil-soluble fraction has a relatively high, average equivalent weight, i.e., generally greater than 450. This fraction in aqueous solution is highly sensitive to precipitation by calcium and magnesium ions and is strongly adsorbed in the formation. This fraction has the ability to sharply lower the interfacial tension between oil and water as compared to the water-soluble fraction.

The equivalent weight as used herein means the molecular weight of the sodium salt of the sulfonic acid divided by the number of $SO_3$ groups per molecule. Where the positive ion of the sulfonate is other than sodium, the equivalent weight ranges of the invention will differ somewhat from the limits given herein.

The water-soluble fraction has a relatively low average equivalent weight, i.e., generally less than 450. It has a lesser effect on interfacial tension and is relatively stable in the formation. It does not have as strong a tendency to adsorb on the rock surface and is not precipitated to any appreciable extent by contaminating ions in the formation water.

It is known that sulfonate surfactants are sensitive to the presence of calcium and magnesium ions in the formation and formation water. When brought into contact the undesirable bivalent cations and the surfactant will combine to form insoluble precipitates in aqueous solution and the surfactant is unavailable to lower the interfacial tension between the oil and water. This effect is shown in U.S. Patent No. 3,302,713. Due to this precipitation of the surfactant it has been desirable to remove the contaminating ions from the flooding water by pretreatment or by use of surfactants which are less susceptible to precipitation.

It is also known that the sulfonated surfactants are strongly adsorbed by the rock surface. Much greater quantities of surfactant than that necessary to lower interfacial tension must be employed to effectively recover the formation oil due to the depletion of the surfactant by precipitation and adsorption.

It has been found that precipitation and adsorption primarily attack the high equivalent weight surfactants and the low equivalent weight surfactants move through the formation essentially unaffected by these factors. The following example illustrates the relationship between adsorption of the surfactants and their equivalent weights.

EXAMPLE I

Five samples of sodium alkyl aryl sulfonate of varying average equivalent weights were added in 0.5 weight percent concentrations to 25 ml. of water. Seven grams of montmorillonite clays were added to each surfactant solution and agitated for approximately eight hours. The solutions were allowed to settle for approximately 24 hours. Portions of the solutions were withdrawn and subjected to ultra violet analysis to determine the quantity of surfactant which remained in solution and unadsorbed by the montmorillonite. The results of these analyses were:

| Surfactant fraction | Approximate equivalent weight | Relative montmorillonite adsorption |
| --- | --- | --- |
| 1 | 300 | 0.4 |
| 2 | 330 | 0.8 |
| 3 | 340 | 4.1 |
| 4 | 400 | 6.7 |
| 5 | 460 | 8.6 |

There are a number of methods for producing separate water-soluble and oil-soluble fractions of a sulfonated surfactant. The equilibration method is accomplished by simply adding the total sulfonated surfactant to either the material of the oil bank or water bank and then contacting the mixture with the other bank material. If the oil and water banks are allowed to remain in contact for a sufficient period of time, the water-soluble material will concentrate in the water phase and the oil-soluble material will concentrate in the oil phase. The length of time necessary to reach equilibrium conditions will depend on a number of factors including ambient temperature and pressure, the concentration of surfactant added, the relative proportions of oil-soluble surfactant and water-soluble surfactant, and the compositions and relative volumes of the oil and water phases.

Another method of producing the surfactants is the solvent fractionating method. This method is more precise than the equilibration method but is more complex. In the solvent fractionating method the surfactant is first diluted in an aqueous solution and then successively contacted with a relatively non-polar solvent and then with a solvent which is more polar or water-like. The solvent fractionation method is shown more clearly in the following example.

EXAMPLE II

A 47.11 gram sample of a sodium alkyl aryl sulfonate was dissolved in 760 milliliters of 50 percent aqueous isopropyl alcohol to form an aqueous surfactant solution. The solution was contacted with 300 ml. of benzene and then the benzene layer was removed. The benzene was flashed off and the surfactant which had been extracted into the benzene was analyzed to determine its equivalent weight. The aqueous surfactant solution was contacted with successive amounts of benzene and then with successive amounts of chloroform. The solvent phase was withdrawn in each instance after a brief contact with the surfactant solution, the solvent was flashed off and the equivalent weight of the extracted surfactant determined. The results of these successive extractions were as follows:

| Run | Solvent | Percent sulfonate extracted | Equivalent weight of surfactant extracted in solvent |
| --- | --- | --- | --- |
| 1 | 300 ml. benzene | 16.5 | 623 |
| 2 | 100 ml. benzene | 6.9 | 603 |
| 3 | 100 ml. benzene | 3.9 | 521 |
| 4 | 200 ml. benzene | 3.7 | 468 |
| 5 | 100 ml. chloroform | 10.2 | 496 |
| 6 | 100 ml. chloroform | 8.6 | 460 |
| 7 | 200 ml. chloroform | 5.5 | 410 |
| 8 | Residue | 44.7 | 342 |
| | | 100.0 | |

The preferred method for producing separate oil-soluble and water-soluble fractions of the surfactant is to separately sulfonate separate streams of a refining process of a vacuum gas-oil distillate. The sulfonation reaction is described in detail in U.S. Patent No. 3,302,713 and may include sulfonation by agitation with excess oleum or reaction with gaseous $SO_3$. After sulfonation the solution is neutralized with a neutralizing agent such as $NH_4OH$, $KOH$, $LiOH$, $MgCl_2$, $CaCl_2$, $BaCl_2$ and aliphatic and aromatic organic amines to give the corresponding salts. $MgCl_2$, $CaCl_2$ and $BaCl_2$ are particularly useful in the production of the high equivalent weight, oil-soluble surfactant. While the bivalent cation salts of the high equivalent weight surfactant have low solubility in aqueous solution, these salts are highly soluble in non-polar solvents. In fact these salts are even more soluble than the sodium salts of the surfactant in oil.

For the production of the oil-soluble, high equivalent weight sulfonated surfactant it is preferred to sulfonate the aromatic portion of the raffinate of the phenol extraction process. The phenol extraction process, as is well known to those skilled in the art of petroleum refining, is a process for the removal of aromatic components of the distillate of a petroleum crude. The process employs solvent extraction by contacting the distillate with phenol. The distillate and solvent mixture segregates into two phases: an upper phase called the raffinate and a lower phase called the phenol extract. The raffinate contains a high proportion of single-ring, sulfonatable hydrocarbons which will yield a high proportion of high equivalent weight, oil-soluble surfactants upon sulfonation.

While it is preferred to sulfonate the raffinate and extract of the phenol extraction process, the raffinate and extract of other solvent extraction processes may also be sulfonated to produce the desired surfactants. Other solvent extraction processes having raffinates and extracts which may be sulfonated within the scope of this invention include processes using 2–2 dichlor ethyl ether, furfural nitrobenzene, sulfur dioxide, cresol-propane, phenol-water, sulfur dioxide-benzene, and diethylene glycol-water as solvents.

The boiling range of a petroleum crude fraction which contains sulfonatable hydrocarbons useful in the practice of this invention is greater than the boiling range disclosed in U.S. Patent No. 3,302,713, Ahearn et al. The Ahearn et al. patent discloses the use of surfactants obtained from the sulfonation of a crude fraction which occurs in the 700° to 1100° F. (corrected to atmospheric pressure) boiling range. The relatively narrow boiling range in the Ahearn et al. patent is necessary to ensure that the proper proportions of single-ring and multi-ring aromatics are present in the crude fraction to be sulfonated to produce the corresponding surfactants. Generally the lower boiling range fractions produce a higher proportion of single-ring aromatics than do the higher boiling range fractions. As was stated hereinbefore, under similar sulfonating conditions the single-ring aromatics produce a high equivalent weight, preferentially oil-dispersible, potent surfactant whereas the multi-ring aromatics produce a low equivalent weight, preferentially water-dispersible relatively impotent surfactant. Where the total product of sulfonated surfactants is to be used en masse in the waterflooding operation and without segregation into high and low equivalent weight fractions, it is necessary that the feedstock to be sulfonated contain the proper proportion of single-ring and multi-ring aromatics. As will be discussed in greater detail hereinafter, the high equivalent weight surfactant has the predominant effect on lowering interfacial tension. This material is not readily dispersible in an aqueous medium but will disperse if sufficient amounts of low equivalent weight surfactant are also added to the solution. In the present invention the boiling range fraction is not as critical since the high equivalent weight material can be obtained from one feedstock and low equivalent weight material from another. Since the high and low equivalent weight fractions are obtained from separate sources or are separately segregated from the same source, the relative portions of the constituents of these materials in the feedstock are less important. It is only important that the feedstock contain sufficient quantities of either the high or low equivalent weight surfactant producing materials to produce economical quantities. It has been found that a 400° to 1200° F. boiling range fraction of a petroleum crude is suitable for production of the high and low equivalent weight fractions of this invention. The preferred boiling range fraction will be within 600° to 1100° F. (The boiling ranges which are specified herein have been corrected to atmospheric pressure.)

The crude oils which are suitable for sulfonation are preferably naphthenic although paraffinic crudes may also be used and to a limited extent aromatic crudes. It is only necessary that the crude contain a sufficient quantity of sulfonatable hydrocarbons.

In the preferred embodiment of the invention the high equivalent weight, oil-soluble surfactant is added to a non-polar liquid such as crude oil and injected as a first bank. The low equivalent weight, water-soluble surfactant is added as a following bank. The superior recovery of this system is illustrated in the following examples.

EXAMPLE III

Two 6″ x 1″ Bartlesville sandstone cores (permeability —approximately 2 darcies) were flooded to saturation with a filtered oil field brine, then flooded to saturation with a South Texas crude oil, and finally water-flooded to residual oil saturation. Run 1 was a tertiary flood of one of the cores with a continuous bank of synthetic brine (1.2 percent $Na_2SO_4$ in water) containing 0.5 weight percent of a low equivalent weight (234) sodium alkyl aryl sulfonate. Run 2 was a tertiary flood of the second core with a 0.5 pore volume bank of a South Texas crude oil containing 0.5 weight percent of high equivalent weight (630) sodium alkyl aryl sulfonate followed by a continuous bank of low equivalent weight (234 sodium alkyl aryl sulfonate in synthetic brine. The respective recoveries of the two runs were:

OIL RECOVERY—PERCENT OF RESIDUAL OIL

| Pore volumes injected | Run 1 | Run 2* |
|---|---|---|
| 0.5 | 0 | 18 |
| 0.75 | 4 | 38 |
| 1.0 | 4 | 48 |
| 1.5 | 5 | 56 |
| 2 | 5 | 64 |
| 3 | 5 | 70 |
| 4 | 5 | 73 |

* Recovery in addition to recovery of the injected 0.5 pore volume bank of oil.

EXAMPLE IV

Four 6″ x 1″ cores were flooded to saturation with a filtered oil field brine, then flooded to saturation with a South Texas crude oil, and finally waterflooded to residual oil saturation with a filtered oil field brine. Run 1 was a tertiary flood of core 1, a Bartlesville sandstone core having a permeability of 1.99 darcies. The run was conducted with a continuous bank of low equivalent weight (234) sodium alkyl aryl sulfonate in 0.5 weight percent concentration in synthetic brine (1.2 weight percent $Na_2SO_4$ in water). Run 2 was a tertiary flood of core 2, a Bartlesville sandstone core having a permeability of 1.927 darcies. The run was conducted by interjecting a 0.5 pore volume bank of a South Texas crude oil containing 0.5 weight percent of high equivalent weight (623) sodium alkyl aryl sulfonate and following that bank with a continuous bank of Catahoula brine. Run 3 was a tertiary flood of core 3, a Berea sandstone core having a permeability of 0.293 darcies. The run was conducted by injecting a continuous bank of synthetic brine containing 0.5 weight percent of high equivalent weight (623) and 0.25 weight percent of low equivalent weight (234) sodium alkyl aryl sulfonate. Run 4 was a tertiary flood of core 4, a Berea sandstone having a permeability of 0.383 darcies. The run was conducted by injecting 0.5 pore volume bank of a South Texas crude oil containing 0.5 weight percent high equivalent weight (623) sodium alkyl aryl sulfonate and then a continuous bank of synthetic brine containing 0.25 weight percent low equivalent weight (234) sodium alkyl aryl sulfonate. The respective recoveries of these runs were:

| | Recovery, percent of residual oil | | | |
|---|---|---|---|---|
| Pore volumes injected | Run 1 | Run 2* | Run 3 | Run 4* |
| 0.5 | 0 | 2 | 22 | 30 |
| 0.75 | 4 | 9 | 34 | 47 |
| 1.0 | 4 | 13 | 41 | 55 |
| 1.5 | 5 | 15 | 51 | 65 |
| 2.0 | 5 | 15 | 56 | 71 |
| 2.5 | 5 | 15 | 59 | 75 |
| 3.0 | 5 | 15 | 60 | 77 |

* Recovery in addition to recovery of the 0.5 pore volume bank of oil.

The principles which cause increased recovery in the method of the invention are not totally understood. It is felt that dispersion of the high equivalent weight, oil-soluble surfactant fraction in the non-polar phase insulates this fraction from the water-wet rock matrix and thereby prevents adsorption. In the same manner the high equivalent weight material is insulated from the connate water and aqueous flooding medium and will not precipitate when contacted by bivalent cations. Since the high equivalent weight, highly potent fraction is not depleted by adsorption and precipitation, it is available to act on the oil-water interface to lower the interfacial tension and promote oil recovery.

The low equivalent weight surfactant in the non-polar or aqueous bank also assists in the recovery mechanism.

The benefit of this following bank is clearly illustrated in comparison of Runs 2 and 4 of Example IV. When only a non-polar bank containing the high equivalent weight material was employed, the recovery was limited to 15 percent of the residual oil. Where this bank was followed by a polar bank containing the low equivalent weight surfactant the recovery increased to 77 percent. The manner in which the low equivalent weight surfactant assists in the recovery is not completely understood but appears to be due to an interaction of the high and low equivalent weight surfactant molecules at the interface between the banks giving an optimum lowering in interfacial tension.

The amount of sulfonate surfactant to be used in a given oil recovery operation may vary considerably depending on such factors as the salt content of the water employed, the type of oil, the nature of the oil-bearing formation, the ability of the surfactant to reduce the interfacial tension between the oil and the flood water and the relative proportions of high equivalent weight and low equivalent weight surfactants employed in the oil bank and water bank respectively. The concentration of the sulfonate should never be so great as to interfere with the injection of flood water into the formation. Where excessive amounts of surfactant are employed a portion will not go into solution and the undissolved portion might plug the formation.

Suitable concentration of the oil-dispersible and water-dispersible surfactants in the oil bank and water bank range from 0.01 percent by weight up to 5 percent or more depending on the effectiveness of the particular surfactant being used. The upper limit of these ranges is usually determined by the solubility of the material in the oil or brine and by the fact that the use of larger concentrations is economically less attractive. The lower limit is dependent upon the quantity of surfactant necessary to appreciably affect the interfacial tension between the oil and the brine.

The size of the non-polar bank including the dispersed high equivalent weight should be between 0.5 percent and 20 percent of the pore volume of the reservoir to be flooded and will preferably be between 2 percent and 10 percent. The bank size used is dependent primarily on the volume of the reservoir to be swept and economic considerations.

The bank size may be chosen so that the bank retains its continuity at the withdrawal well but it may be economically advantageous to employ a smaller bank size and allow small breaks to occur in the bank continuity prior to recovery at the producing well. However, the bank size should be sufficiently large so that substantially all of the reservoir is swept before the bank becomes discontinuous.

The size of the polar bank containing the low equivalent weight surfactant may vary from 0.5 percent to 100 percent of the pore volume. Preferably this bank should be from 25 percent to 75 percent of the pore volume of the reservoir to be swept. Economics do not limit the bank size of the polar bank as much as in the non-polar bank because of the less expensive materials, e.g. water, employed.

The oil used as the non-polar bank and containing the oil dispersible surfactant may be any organic liquid which is substantially miscible with the reservoir oil and which has the ability to disperse or take into solution the oil-soluble surfactant. It is preferred to use an aromatic or naphthenic hydrocarbon and as a particular example a field crude having substantial portion of aromatic or napthenic constituents may be used. Paraffinic hydrocarbons may also be used; however, in the lower molecular weight paraffins the surfactant may not be as readily dispersed.

The polar material is preferably water and may be either fresh or brine. A distinct advantage of the invention is the compatibility of the banks with a displacing flood medium that has a high inoganic salt content since the surfactant fraction which is in intimate contact with the flooding medium is essentially insensitive to the inorganic salts and the salt sensitive surfactant is insulated from contact with the flood medium by its non-polar carrying medium. While the preferred polar bank is water, it is within the scope of this invention to employ any polar fluid which has the ability to disperse the lower equivalent weight surfactant and is compatible with the first bank material (i.e. does not form a formation plugging emulsion with the first bank material).

While the present invention is directed primarily toward the recovery of oil from a subterranean oil-bearing formation through an improved water-flooding technique, the invention is not limited to such an application. The method is equally applicable to the treating of water injection wells in a waterflooding operation to remove localized, high residual oil saturations. Moreover, the surfactant banks may be heated and applied to reservoirs containing highly viscous oils.

Materials not incompatible with the practice of the invention may be added to the surfactant solutions. Water-soluble thickeners are potentially very attractive for use in combination with the surfactant dissolved in the water bank for displacing oils which are more viscous than water from the oil-bearing deposits. A number of materials have been previously suggested as water thickeners including water-soluble polyacrylamides, polyacrylates and sulfonated vinyl aromatic polymers, colloidal clays, etc. Particularly attractive water thickeners are water-soluble biopolymers such as dextran and especially polymers of the type produced by microorganisms, genus Xanthomonas, described in U.S. Patent No. 3,305,016, issued Feb. 21, 1967, entitled "Displacement of Oil from Partially Depleted Reservoirs." Generally speaking, 1 percent or less of water-soluble thickener is sufficient to increase the viscosity of the aqueous bank surfactant solution of this invention to the extent desired. Small amounts of other material such as bactericides, rust preventatives, colloidal dispersants, solubilizers, chelating agents, water softening agents and the like may also be used in the practice of this invention.

It will be recognized that a number of variations in the method of this invention may be employed without departing from the spirit or scope of the invention and that variations in the invention which would be obvious to one skilled in the art are intended to be encompassed in the following claims.

What is claimed is:

1. A method for the recovery of oil from a subterranean reservoir comprising:
    (a) injecting into the reservoir a bank consisting essentially of a non-polar liquid and sulfonated hydrocarbon surfactant having an average equivalent weight greater than 450, the surfactant having a greater solubility in the non-polar liquid than in a polar liquid;
    (b) thereafter, injecting into the reservoir a second bank consisting essentially of a polar liquid and a second sulfonated hydrocarbon surfactant having an average equivalent weight less than 450, the second surfactant having a greater solubility in the polar liquid than in the non-polar liquid; and
    (c) displacing the banks into the reservoir to recover oil.

2. The method as defined in claim 1 further comprising injecting an aqueous solution containing a soluble thickening agent subsequent to the injection of the polar and non-polar liquids.

3. The method as defined in claim 1 wherein the surfactants which are preferentially soluble in the polar and non-polar liquids are obtained by sulfonating at least a portion of the sulfonatable constituents which occur in the 600° to 1100° F. boiling range fraction of a petroleum crude.

4. The method as defined in claim 3 wherein the surfactants which are preferentially soluble in the polar and non-polar liquids are fractionated by a solvent fractionation method.

5. The method as defined in claim 3 where the surfactants which are preferentially soluble in the polar and non-polar liquids are obtained by an equilibration method.

6. The method as defined in claim 1 wherein the non-polar liquid is an oil.

7. The method as defined in claim 1 wherein the polar liquid is an aqueous solution.

8. The method as defined in claim 7 wherein the aqueous solution is water.

9. The method as defined in claim 8 wherein the water contains a soluble thickening agent.

10. The method as defined in claim 1 wherein the surfactant which is preferentially soluble in the polar liquid is obtained from the sulfonation of an extract of a solvent extraction of a vacuum gas oil distillate of a 600° to 1100° F. boiling range fraction of a petroleum crude.

11. The method as defined in claim 10 wherein the solvent extraction is a phenol extraction.

12. The method as defined in claim 1 wherein the surfactant which is preferentially soluble in the non-polar liquid is obtained from the sulfonation of a raffinate of a solvent extraction of a vacuum gas-oil distillate of a 600° to 1100° F. boiling range fraction of a petroleum crude.

13. The method as defined in claim 12 wherein the solvent extraction is a phenol extraction.

14. A method for recovery of oil from a subterranean reservoir having at least one injection well and one producing well comprising:
    (a) injecting through the injection well and into the reservoir an oil containing an oil dispersible surfactant obtained by sulfonating at least a portion of the sulfonatable constituents of a raffinate of a phenol extraction of a 600° to 1100 F. boiling range fraction of a vacuum gas-oil distillate of a crude oil;
    (b) then injecting through the injection well and into the reservoir an aqueous solution containing a water dispersible surfactant obtained by sulfonating at least a portion of the sulfonatable constituents of a phenol extract of a phenol extraction of the 600° to 1100° F. boiling range fraction of a vacuum gas-oil distillate of a petroleum crude and a soluble thickening agent;
    (c) then injecting an aqueous solution containing a soluble thickening agent; and
    (d) producing displaced oil from the producing well.

15. A method for treating a water injection well to increase the injectivity of the well comprising:
    (a) injecting a first bank consisting essentially of an oil and a sulfonated hydrocarbon surfactant having an average equivalent weight greater than 450, the surfactant having a greater solubility in the oil than in an aqueous solution;
    (b) thereafter, injecting as a second bank an aqueous solution consisting essentially of water and a second sulfonated hydrocarbon surfactant having an average equivalent weight less than 450, the second surfactant having a greater solubility in the aqueous solution than in an oil; and
    (c) displacing the banks into the reservoir.

16. The method as defined in claim 15 where the preferentially oil soluble surfactant is obtained by sulfonating at least a portion of the sulfonatable constituents which occur in a 600° to 1100° F. boiling range fraction of petroleum crude.

17. The method as defined by claim 15 where the preferentially water soluble surfactant is obtained by sulfonating at least a portion of the sulfonatable constituents which occur in 600° to 1100° F. boiling range fraction of a petroleum crude.

References Cited

UNITED STATES PATENTS

| | | | |
|---|---|---|---|
| 3,421,582 | 1/1969 | Fallgatter | 166—9 |
| 2,927,637 | 3/1960 | Draper | 166—9 |
| 3,006,411 | 10/1961 | Holbrook | 166—9 |
| 3,082,822 | 3/1963 | Holm et al. | 166—9 |
| 3,126,952 | 3/1964 | Jones | 166—9 |
| 3,254,714 | 6/1966 | Gogarty et al. | 166—9 |
| 3,261,399 | 7/1966 | Coppel | 166—9 |
| 3,266,570 | 8/1966 | Gogarty | 166—9 |
| 3,302,713 | 2/1967 | Ahearn et al. | 166—9 |
| 3,307,628 | 3/1967 | Sena | 166—9 |
| 3,324,944 | 6/1967 | Poettmann | 166—9 |
| 3,348,611 | 10/1967 | Reisberg | 166—9 |

STEPHEN J. NOVOSOD, Primary Examiner

U.S. Cl. X.R.

166—274, 305